United States Patent Office 3,623,894
Patented Nov. 30, 1971

3,623,894
TREATING MILK
Ernst-Gunnar Samuelsson, Lund, Sweden, assignor to Food Innovation AB, Norrkoping, Sweden
No Drawing. Filed Dec. 17, 1968, Ser. No. 784,465
Claims priority, application Sweden, Dec. 21, 1967, 17,566/67
Int. Cl. A23c 3/02
U.S. Cl. 99—212　　　　　　　　　　　　　3 Claims

ABSTRACT OF THE DISCLOSURE

Off-flavor development caused by heating milk is prevented by adding to the milk a compound which dissociates to provide oxidizing ions containing a halide.

---

The present invention relates to a method of treating foodstuffs in order to avoid the development of off-flavours when treating said foodstuff at a high temperature, usually in connection with sterilization but also with long-time treatment at a somewhat lower temperature, for instance in a holding cell or autoclave.

In modern methods for the treatment of foodstuffs it often happens that the foodstuffs are subjected to high temperature treatment, usually in connection with sterilization, but sometimes also in another connection. Moreover, it quite often happens that food stuffs are maintained at a somewhat lower temperature for a longer period of time, for instance in so-called holding cells in order to obtain some particular effect. For example when sterilizing milk the milk is heated during one or a few seconds at a temperature of about 140° C. It is often kept in holding cells for about 10–15 minutes at a temperature of 70–80° C. in order to stabilize the proteins of the milk, or at a temperature of pasteurization for about 15 seconds. Particularly by high temperature treatment but also by treatment in a holding cell the milk is subject to a flavour deterioration in view of the formation of denaturation products from the proteins contained in the milk. Said denaturation products, i.a. consisting of sulphur compounds, for instance hydrogen sulphide, mercaptanes, sulphides and disulphides, have a very strong smell and taste also in extremely small concentrations and give the milk an unpleasant cooked or burnt flavour. This flavour deterioration is particularly noticeable in foodstuffs containing proteins, besides milk also in meat, pork, fish, but also other foodstuffs can be impaired in a corresponding way, particularly by high temperature treatment. The foodstuffs in question also often obtain a "harsh" or adstringent character. Up to now it has not been possible to avoid this.

These disadvantages associated with a short high temperature treatment but also treatment for a somewhat longer period of time at a lower temperature result in a reduction of the quality of the finally finished foodstuff. Said treatment methods have for a purpose to enable the storage of the foodstuff for a longer period of time and to facilitate the distribution. Therefore, it is of a great general and economic interest if one could avoid the necessary treatment methods leading to a reduction of the quality.

When dealing with proteinaceous foodstuffs said flavour deterioration, particularly the development of cooked flavour, has been ascribed to the formation of sulphhydryl groups in connection with the heat treatment. As regards milk such sulphhydryl groups are considered to develop by denaturation of the serum proteins, primarily β-lactoglobulin.

Attempts have been made, with some success, to remove the cooked flavour by treating the milk before, during or after the heat treatment with oxygen gas bubbled through the milk. Another presented proposal is to add to the milk, instead of oxygen gas, a predetermined quantity of a substance having the ability of releasing oxygen under decomposition, for instance hydrogen peroxide. Thus, oxygen gas or oxygen in statu nascendi has been used to oxidize the sulphhydryl groups thereby to eliminate same.

To understand the importance of the present invention in connection with the heat treatment of especially milk it should be mentioned that the sulphhydryl groups not only have a negative effect. Other deficiencies that can very easily be developed in milk by oxidation of same are metallic, tallowy or oily flavour. These deficiencies are in fact counterbalanced by the sulphhydryl groups in view of their reducing capacity.

When trying to eliminate the flavour deterioration of the milk by the treatment thereof with molecular and/or nascent oxygen not only the desired results have been obtained. The strange thing happened that it has in fact been possible to eliminate part of the sulphhydryl groups by oxidation, however, not to such a great extent as to completely remove the cooked flavour, but at the same time the oxidation has caused a reversible oxidation of other constituents of the milk, primarily the phospholipids. Furthermore, residues of the oxidizing agents used are adsorbed by the proteins of the milk so as to further reduce, particularly the fat phase and the proteins of the milk later on resulting in a further deterioration of the flavour on prolonged storage.

Thus, it is important when treating the milk, particularly when sterilizing same by heating, to fulfil three different conditions in order not to deteriorate the flavour. Firstly, the amount of sulphhydryl groups must be maintained at a sufficiently low level so as not to result in the cooked flavour. Secondly, the amount of oxidizing agent should, at the same time, be so low as not to overcome the inherent ability of the milk to counteract the formation of oxidation deterioration. This latter condition has its particular importance when storing sterile milk for a longer period of time. Thirdly and finally, a treatment of the milk for the purpose of removing the cooked flavour must not lead to changes of other components in the milk proper so that other flavour deficiencies arise. To fulfil said three conditions is in fact the problem, to which the present invention gives the solution.

One object of the invention is to provide a method of treating proteinaceous foodstuffs in order to avoid the development of bad flavour in connection with for instance high temperature treatment or sterilization of the foodstuffs.

Another object is to provide foodstuffs which, after sterilization, for instance by high temperature treatment, or other treatment, have a flavour closely resembling that of the fresh foodstuffs.

According to the invention the solution of the problem consists in adding to the foodstuff a quantity of a substance which when dissociating can release oxidizing ions containing a halide. Among such substances particularly the substances the oxidizing ions of which contain iodine have been found suitable. A particularly advantageous substance is sodium or potassium iodate. However, also the bromates are useful, particularly the sodium and potassium bromates ($NaBO_3$ and $KBO_3$).

The substance according to the invention selected to bring about the prevention of the arrival of bad flavour by the temperature treatment, can be added to the foodstuff before the temperature treatment but may be added also during or after said treatment depending on the conditions prevailing in each particular case. Those skilled in the art can easily decide how to apply the invention. As regards the question of the quantity of the substance added no definite rules can be made in view of the fact that the quantity will have to be determined from case to case while considering the desired result. Also in this case, however, it is easy to those skilled in the art to make preliminary tests of how to arrive at the desired results.

The technical effect obtained by the invention is extremely surprising and is clear from the following description. Therein the effect of different additions to heat treated milk and also other foodstuffs is compared. All of the additions to milk have been made under the same conditions, namely before the heat treatment. The reason why most of the experiments have been made on milk is partly that milk is particularly well suited for comparing tests, partly that the invention might have its greatest importance i.a. in sterilizing milk by heating and milk sterilization has been a long-standing problem in the art. The milk tested is of bovine origin, for instance from cows, but also other types of milk can, successfully, be treated according to the present invention.

In Table 1 below there is initially shown the effect of adding hydrogen peroxide for comparison. The amount added is expressed in p.p.m. (parts per million). The effect is expressed by giving the concentration of sulphhydryl groups in the milk (meq. (milliequivalents) SH/1) 3 days after the heat treatment.

*Table 1.* Meq. SH/1 in milk with different $H_2O_2$-additions heated in a laboratory pasteurizer and a VTIS-plant (Alfa-Laval Vacu Therm Instant Sterilizer).

| Temperature, °C. | Added amount $H_2O_2$ in p.p.m. | | | |
|---|---|---|---|---|
| | 0 | 300 | 600 | 900 |
| Laboratory pasteurizer: | | | | |
| 60 | 0.11 | 0.08 | 0.09 | 0.07 |
| 70 | 0.12 | 0.08 | 0.08 | 0.07 |
| 80 | 0.12 | 0.08 | 0.08 | 0.08 |
| 90 | 0.17 | 0.09 | 0.08 | 0.09 |
| 100 | 0.21 | 0.15 | 0.10 | 0.08 |
| 110 | 0.18 | 0.10 | 0.10 | 0.11 |
| VTIS: | | | | |
| 120 | 0.17 | 0.11 | 0.10 | 0.11 |
| 130 | 0.17 | 0.11 | 0.10 | 0.10 |
| 140 | 0.18 | 0.08 | 0.10 | 0.09 |

In connection with the SH-determination (titration with $10^{-3}$ M $AgNO_3$ calibrated against cystein hydrochloride) a flavour score was made. It was found that the milk had still a pronounced cooked flavour, i.a. depending on the fact that the sulphhydryl concentration was still too high. Generally, it holds good that the cooked flavour largely correlates with the SH-content. Furthermore, pronounced oxidized or tallowy taste gradually arose in some of the samples, obviously depending on the fact that other constituents of the milk than the sulphhydryl compounds had been oxidized. These defects were still worse after storing. The VTIS-treated milk when flavour-tested gave after 30 days the average score figure 2. The flavour of first class milk is given the highest score figure 5. The deterioration is i.a. connected with the oxidation of the fat phase of the milk by for instance hydrogen peroxide residues adhering to the protein molecules.

Table 2 below shows the effect of adding substances containing a halide in the negative ion, and Table 3 gives a statement on flavour evaluation of the milk samples shown in Table 2. In Table 3 and the following, as above, the flavour has been expressed in scores (5=flavour of quite natural, unmodified milk). In the tables *t* means tin or metal flavour and *c* cooked flavour.

*Table 2.* The influence of potassium bromate, potassium iodate and iodine acetic acid on the SH-content of the milk (meq. SH/1) after 3 days.

| Temperature, °C. | Added amount in p.p.m. | | | | | |
|---|---|---|---|---|---|---|
| | 0 | 25 | 50 | 75 | 100 | 500 |
| | Potassium bromate | | | | | |
| 20 | 0.14 | 0.03 | 0.02 | 0.03 | 0.04 | 0.04 |
| 60 | 0.14 | 0.03 | 0.03 | 0.04 | 0.04 | 0.04 |
| 70 | 0.14 | 0.03 | 0.03 | 0.04 | 0.04 | 0.04 |
| 80 | 0.16 | 0.03 | 0.04 | 0.04 | 0.04 | 0.04 |
| 90 | 0.19 | 0.05 | 0.05 | 0.05 | 0.06 | 0.04 |
| | Potassium iodate | | | | | |
| 20 | 0.14 | 0.04 | 0.02 | 0.03 | 0.03 | 0.02 |
| 60 | 0.14 | 0.04 | 0.03 | 0.03 | 0.03 | 0.03 |
| 70 | 0.14 | 0.04 | 0.03 | 0.03 | 0.04 | 0.05 |
| 80 | 0.16 | 0.04 | 0.05 | 0.05 | 0.05 | 0.05 |
| 90 | 0.19 | 0.04 | 0.05 | 0.05 | 0.05 | 0.05 |
| | Iodine acetic acid | | | | | |
| 20 | 0.14 | 0.03 | 0.05 | 0.02 | 0.02 | 0.06 |
| 60 | 0.14 | 0.03 | 0.04 | 0.03 | 0.04 | 0.06 |
| 70 | 0.14 | 0.03 | 0.04 | 0.03 | 0.04 | 0.06 |
| 80 | 0.16 | 0.04 | 0.07 | 0.11 | 0.08 | 0.07 |
| 90 | 0.19 | 0.09 | 0.07 | 0.13 | 0.12 | 0.07 |

*Table 3.* The influence of potassium bromate, potassium iodate and iodine acetic acid on the flavour of the milk after 3 days.

| Temperature, °C. | Added amount in p.p.m. | | | | | |
|---|---|---|---|---|---|---|
| | 0 | 25 | 50 | 75 | 100 | 500 |
| | Potassium bromate | | | | | |
| 20 | 3 t | 4 | 4− | 4 | 4− | 4 |
| 60 | 3 t | 3 t | 3 t | 3 t | 3 t | 3 t |
| 70 | 4 | 4− t | 3+ t | 3 t | 3 t | 3 t |
| 80 | 4 | 4 | 4 | 4 | 4 | 4 |
| 90 | 3 c | 4 | 4 | 4 | 4 | 4 |
| | Potassium iodate | | | | | |
| 20 | 3 t | 4 | 4 | 4 | 4 | 4 |
| 60 | 3 t | 4− t | 4− | 4 | 4 | 4 |
| 70 | 4 | 4 | 4− | 4 | 4 | 4 |
| 80 | 4 | 4 | 4− | 4− | 4 | 4 |
| 90 | 3 c | 4 | 4 | 4 | 4 | 4 |
| | Iodine acetic acid | | | | | |
| 20 | 3 t | 4− t | 4 | 4 | 4 | 4 |
| 60 | 3 t | 3 t | 3 t | 3 t | 3 t | 3 |
| 70 | 4 | 3 c | 3 t | 3 t | 3 t | t 3 |
| 80 | 4 | 4 | 4 | 4 | 4 | 4 |
| 90 | 3 c | 4− c | 4 | 4 | 4 | 4 |

From Tables 1–3 above and other data it is clearly obvious that treatment of milk with substances having the ability of releasing oxidizing ions containing halide when dissociating have a much greater effect than treatment with for instance hydrogen peroxide. Substances having the ability of releasing oxidizing ions of any kind have a similar effect although it is not as pronounced as when the ions in question contain a halide. Such substances are for instance perborate, performic acid, peracetic acid and several others.

The tables show that the addititon of substances according to the invention brings about a reduction of the $SH_2$-content with about 78% already at pasteurizing temperatures, whereas the corresponding figure for the treatment with hydrogen peroxide is only about 35%. Moreover it is clear that the effect of the iodate ions is the greatest of those shown in the table. The SH-content deviates very little from those SH-contents obtained when adding bromate and iodine acetic acid, but the flavour is obviously altogether the best when adding potassium iodate. Particularly when adding 50 p.p.m. and more the score is altogether high and, moreover, the tin taste has been completely eliminated.

Another interesting observation can be made in this connection. When adding only 25 p.p.m. potassium iodate the SH-content in most cases is higher than when adding a corresponding quantity of potassium bromate and iodine acetic acid. In spite of this fact the flavour score is largely the same as the result when adding 50 p.p.m. or more. This seems to show that there is no absolute correlation between the SH-content and the flavour of the milk. As a matter of fact, the iodate addition has been found to have an extremely technical effect which is highly surprising and the nature of which has not been explained.

Tables 4 and 5 below give further proof of the technical effect of the invention. The tables concern VTIS-treated milk sterilized at 140° C. Thus, Table 4 shows that the SH-content also at this high temperature treatment with its strong formation of sulphhydryl compounds has decreased with about 78% already after a potassium iodate addition of only 30 p.p.m. The corresponding figure when adding hydrogen peroxide in an amount of 300 p.p.m. is according to Table 1 merely about 50% under the same conditions. As could have been expected from the SH-contents the flavour evaluation is substantially more favourable for the milk having added thereto potassium iodate. The score figure after 3 days is 5 according to Table 4, whereas it is only 4 for milk treated with hydrogen peroxide.

What is still more important, however, is the fact that the flavour is improved when storing iodate treated milk. As mentioned above oxidation deficiencies can arise in hydrogen peroxide treated milk to such a greate extent as to give a score after 30 days storage of only about 2. The iodate treated milk, however, has been given the score figure after 30 days storage according to table 5. In other words, after one month storage milk sterilized at 140° C. and treated with iodate had the same flavour as ordinary, first class consumption milk. Thus, it seems as if it were possible by adding iodate completely to prevent the development of off-flavours when sterilizing milk.

In passing, an interesting observation may be mentioned. Table 4 shows that milk, when warmed to 20° C., obtains a very small SH-content, which is to be expected. However, the interesting point is that the milk in spite of this fact obtains a flavour score of only 3 in view of the development of a metallic flavour. This is a proof of the condition mentioned above that a moderate SH-content is positive rather than negative. In this case the SH-content has, obviously, been so low as not to protect the fat constituents of the milk against oxidation by the reducing effect of the sulphhydryl groups. This phenomenon illustrates another striking property of particularly the iodate ions: In one way or another they seem to bring about that a very favourable balance of the SH-content automatically takes place. This extemely important property is noticed especially when storing sterilized milk for a longer period of time, which is clear from Table 5. Evidently, not only the SH-content is lowered to a level eliminating the cooked flavour and yet being sufficient to protect against the development of oxidation deterioration in the normal treatment of the milk but also there is no primary or secondary oxidation of the milk fat by the addition of the iodate ions.

Table 4. SH-determination and flavour evaluation of VTIS-treated milk having added thereto potassium iodate, after 3 days.

| Temperature, °C. | Milliequivalents, SH/1 | | | | | |
|---|---|---|---|---|---|---|
| | Added amount in— | | | | | |
| | 0 p.p.m. | 30 p.p.m. | 40 p.p.m. | 50 p.p.m. | 60 p.p.m. | 70 p.p.m. |
| 20 | 0.06 | | | | | |
| VTIS 140 | 0.14 | 0.03 | 0.03 | 0.03 | 0.04 | 0.04 |
| | Flavour evaluation, score | | | | | |
| 20 | 3 t | | | | | |
| VTIS 140 | 4 | 5 | 5 | 5 | 5 | 5 |

Table 5. SH-contents and flavour scores in VTIS-treated sterile milk having added thereto potassium iodate. Sterilization temperature 140° C.

| Test | KIO₃ conc., p.p.m. | Meq. SH/1 | | Flavour score | |
|---|---|---|---|---|---|
| | | 3 days | 30 days | 3 days | 30 days |
| 1 | 30 | 0.04 | 0.04 | 5 | 5 |
| 2 | 40 | 0.04 | 0.03 | 4+ | 5 |
| 3 | 50 | 0.04 | 0.03 | 3 | 5 |

When estimating the present invention against the background of the prior art one could hardly abstain from judging whether this is an application obvious to those skilled in the art of the previous suggestions to improve the flavour of sterilized foodstuffs by an oxidation process. Therefore, it is of interest to compare the oxidation ability of on one hand for instance hydrogen peroxide and on the other hand for instance potassium iodate in the concentrations relevant in connection with the treatment of milk. For example one can select the seemingly optimal concentration of hydrogen peroxide, 300 p.p.m., according to the experiments in Table 1 of sterilizing at 140° C. and the seemingly optimal concentration of potassium iodate, 30 p.p.m., used in Tables 4 and 5. The following results are then obtained:

1 mole $H_2O_2$ weighs 34 g.
1 mole $KIO_3$ weighs 214 g.
1 mole $H_2O_2$=2 oxidation equivalents
1 mole $KIO_3$=6 oxidation equivalents $$300 \text{ g. } H_2O_2 = \frac{2 \cdot 300}{34} = 17.6 \text{ oxidation equivalents}$$

$$30 \text{ g. } KIO_3 = \frac{6 \cdot 30}{214} = 0.8 \text{ oxidation equivalent}$$

Thus, 22 times as many oxidation equivalents are available from the strong oxidation agent nascent oxygen. If one wants to use an oxidation agent according to the prior art to counteract the formation of bad flavour and finds that hydrogen peroxide gives a certain although insufficient effect it cannot be attractive to use a substance that can be expected to give an inferior effect.

Moreover, if the figures obtained are correlated with the reduction of the SH-content obtained in the experiments, it seems to be clear that as the nascent oxygen has reduced the SH-content with only about 50% whereas the addition of the iodate quantity having the relatively lower number of oxidation equivalents (22-fold less) has caused a reduction of the SH-content with about 78% there must be different mechanisms of function. Even if it cannot be excluded that an oxidation has occurred this is, obviously, not alone critical to the result of the treatment. Thus, it is quite clear that the flavour improving effect is not proportional to the amount of added oxidizing substance or its oxidating ability. If, however, an oxidation is essential in this connection it is obvious that the oxidizing substance must possess particular characteristics having relevance when oxidating the substances leading to for instance cooked flavour. For instance, iodate and bromate have such characteristics. However, it is also possible that the ions suggested counteract the formation of sulphhydryl compounds in the heat treatment.

To show that the invention is applicable also to other foodstuffs than milk Tables 6 and 7 below show the results obtained when treating pork, meat and fish, viz herring, respectively, with potassium iodate, $KIO_3$. The tables show the amount of sulphhydryl groups contained in said foodstuffs after sterilization at 115° C. during 20 minutes as a function of added amount $KIO_3$ in parts per million.

*Table 6.*—PORK MEAT TREATED WITH $KIO_3$

| Added amount of $KIO_3$ in p.p.m.: | Amount of SH-groups after 24 hours |
|---|---|
| 0 | 167 |
| 5 | 103 |
| 10 | 55 |
| 20 | 24 |

*Table 7.*—HERRING TREATED WITH $KIO_3$

| Added amount of $KIO_3$ in p.p.m.: | Amount of SH-groups after 24 hours |
|---|---|
| 0 | 234 |
| 5 | 153 |
| 10 | 109 |
| 20 | 34 |

In these tests the amount of SH-groups was determined with thiamine disulphide according to Harland and Ashworth.

The data given in Tables 6 and 7 clearly show that the present invention is applicable also on other foodstuffs than milk and that a treatment with $KIO_3$ in indicated amounts will reduce the amount of SH-groups and thus also improve the flavour of the sterilized foodstuffs.

In the above disclosure there has been reported results obtained while using substances having the ability of releasing oxidizing ions containing a halide when dissociating, and the disclosure has gradually been concentrated to experimental results obtained while using iodate. This does not means that the invention is limited to said substances but is due to the fact that the substances discussed have the greatest interest. As already mentioned also other oxidizing ions have, however, shown to have similar characteristics. While disregarding the outstanding characteristics of the iodine compounds in the present connection they have their great interest from two reasons. Usually, there is a natural dislike against adding foreign substances to a foodstuff. When dealing with treatment of for instance milk, however, justified objections can hardly be made against the additional iodine in view of the fact that iodine is normally present in milk in considerable amounts. Moreover, iodine may even be an additive to for instance milk desirable from the point of view of elementary physiology. In this connection it is brought to mind that the world health authorities have recommended enrichment of for instance sodium chloride with iodine for preventing goitre.

Also, the disclosure might be considered one-sided to discuss the treatment of milk. However, this depends on the fact that, as already indicated, milk is particularly well suited for treatment by the method of the invention. It also depends on the fact that sterile milk can be expected to be a very important protein source for people in the countries under development. One qualification for making sterile milk such desirable protein contribution is, however, that the natural flavour thereof is not destroyed by the sterilization or by longer periods of storage under long transportation. However, the invention is not delimited to the treatment of milk but comprises also treatment of other foodstuffs within the scope of the following claims.

What is claimed is:

1. A method of treating milk in order to avoid the development therein of bad flavour when subjecting said milk to heating to a temperature within ther ange 60–140° C., the improvement which consists in adding to the milk from 5 to 30 parts per million, based on the parts by weight of said milk of a substance selected from the group consisting of $NaIO_3$, $NaBrO_3$, $KIO_3$ and $KBrO_3$.

2. The improved method defined in claim 1, wherein the proteinaceous foodstuff is milk being subjected to sterilization by heating to from about 100 to about 120° C.

3. The improved method defined in claim 1, wherein the added substance is potassium iodate.

References Cited
UNITED STATES PATENTS

| 2,125,398 | 8/1938 | Reichert et al. | 99—213 |
| 2,663,643 | 12/1953 | Hansen | 99—213 X |
| 2,788,283 | 4/1957 | Stewart, Jr. et al. | 99—215 X |

LIONEL M. SHAPIRO, Primary Examiner

D. M. NAFF, Assistant Examiner

U.S. Cl. X.R.

99—61, 151